*(12)* United States Patent
Lurgo

(10) Patent No.: US 12,157,571 B2
(45) Date of Patent: Dec. 3, 2024

(54) AIRCRAFT SEAL

(71) Applicant: Airbus Operations Limited, Bristol (GB)

(72) Inventor: Alessandromaria Lurgo, Bristol (GB)

(73) Assignee: Airbus Operations Limited, Bristol (GB)

( * ) Notice: Subject to any disclaimer, the term of this patent is extended or adjusted under 35 U.S.C. 154(b) by 267 days.

(21) Appl. No.: 17/847,719

(22) Filed: Jun. 23, 2022

(65) Prior Publication Data

US 2022/0411042 A1    Dec. 29, 2022

(30) Foreign Application Priority Data

Jun. 25, 2021   (GB) ...................................... 2109213

(51) Int. Cl.
*B64C 7/00* (2006.01)
*B64C 1/00* (2006.01)
*B64C 9/18* (2006.01)
*B64C 13/02* (2006.01)
*B64D 47/00* (2006.01)

(52) U.S. Cl.
CPC ............. *B64C 7/00* (2013.01); *B64C 1/0009* (2013.01); *B64C 9/18* (2013.01); *B64C 13/02* (2013.01); *B64D 47/00* (2013.01)

(58) Field of Classification Search
CPC ... F16J 15/3296; F16J 277/317; F16J 277/321
See application file for complete search history.

(56) References Cited

U.S. PATENT DOCUMENTS

| 5,424,596 | A | * | 6/1995 | Mendenhall | H10N 30/2023 310/317 |
| 2010/0018199 | A1 | * | 1/2010 | Boock | F15B 21/008 60/469 |
| 2010/0288888 | A1 | * | 11/2010 | Coconnier | B64C 7/00 244/214 |
| 2017/0283034 | A1 | * | 10/2017 | Balzer | B64C 9/16 |
| 2020/0408473 | A1 | * | 12/2020 | Frechette | H01L 23/3736 |
| 2022/0403935 | A1 | * | 12/2022 | Lauer | F16J 15/3296 |

FOREIGN PATENT DOCUMENTS

GB    2555480 A    5/2018

OTHER PUBLICATIONS

British Search Report for Application No. 2109213 dated Dec. 16, 2021.

* cited by examiner

*Primary Examiner* — Richard Green
*Assistant Examiner* — Nevena Aleksic
(74) *Attorney, Agent, or Firm* — KDW Firm PLLC

(57) ABSTRACT

A blade seal for sealing a gap between a first aircraft component and a second aircraft component, including a flexible seal member having a first end for attaching to the first aircraft component and a second end for extending towards the second aircraft component, a sensor and an actuator directly coupled to the flexible seal member. The sensor is configured to detect deformation of the flexible seal member and send a signal to the actuator in response to the deformation, and the actuator is configured to impart a load on the flexible seal member and to activate only in response to the signal received directly from the sensor by the actuator to counter the detected deformation of the flexible seal member.

18 Claims, 5 Drawing Sheets

AIRCRAFT SEAL

CROSS-REFERENCE TO RELATED APPLICATION

This application claims priority to UK Patent Application No. GB 2109213.5 filed Jun. 25, 2021, the entire disclosure of which is incorporated by reference herein.

TECHNICAL FIELD

The disclosure herein relates to a blade seal, an aircraft assembly comprising the blade seal, an aircraft, and a method of operating an aircraft.

BACKGROUND

Seals are used in aircraft to seal gaps between components and help maintain aerodynamic profiles during flight. Seals are typically fixed to a part of the aircraft at one end, with the free end of the seal being free to bend and flex. As a result, the seal may experience undesirable vibrations caused by vortices and other aerodynamic forces during flight. Constant deflection of the seal may cause wear through fatigue. Excessive deflection of the seal may cause the seal to move into the path of a moveable aircraft component, where it may become trapped or crushed. Wear or failure of the seal is likely to require immediate attention and can require replacement of the seal before next flight.

While seals may be made of a variety of materials, simply increasing the stiffness of the seal or the seal material to avoid excessive deflection is generally undesirable as it can add weight to the seal and/or the aircraft structure to which the seal is attached due to the higher loads imparted by the stiffer seal.

SUMMARY

A blade seal for sealing a gap between a first aircraft component and a second aircraft component, comprising a flexible seal member having a first end for attaching to the first aircraft component and a second end for extending towards the second aircraft component, a sensor and an actuator directly coupled to the flexible seal member, wherein the sensor is configured to detect deformation of the flexible seal member and send a signal to the actuator in response to the deformation, the actuator is configured to impart a load on the flexible seal member and to activate only in response to the signal received directly from the sensor by the actuator so as to counter the detected deformation of the flexible seal member.

With this arrangement, deformation of the flexible seal member can be monitored and counteracted, either partially or wholly. The deformation of the flexible seal member may be reduced, such that the flexible seal member is partially or wholly returned to its original shape. The blade seal deflection is passively monitored and activated in a closed loop, such that the response of the system to deformation of the flexible seal member can be automatic and near instantaneous. This can mitigate the need for expensive and heavy external systems, such as an external power supply or signal processing by a computer processor.

The flexible seal member may be flexible relative to the stiffness of the first aircraft component. Flexible seal refers to the intended flexibility afforded to the seal material to deform e.g. by bending, without breaking or plastically deforming during normal use.

Activation of the actuator may be a deformation of the actuator, or may be a change in internal configuration of the actuator, such as a change in in mechanical stiffness or mechanical stress.

The sensor may passively send a signal to the actuator, i.e. the signal may be a simple continuous output from the sensor directly as an input to the actuator. The sensor may not be actively controlled to detect deflection of the flexible seal member. The sensor may not be actively controlled to output the signal. This passive action of the sensor may mean that no additional or external processing and/or control system is required for the sensor to transmit the signal to the actuator.

The actuator activates only in response to the signal received directly from the sensor by the actuator. The action of the actuator may mean that no additional or external processing and/or control system is required for the actuator to activate to counter the detected deformation of the flexible seal member.

Optionally, the actuator is a piezoelectric actuator and/or the sensor is a piezoelectric sensor.

A piezoelectric material is an exemplary passive material that is able to passively generate an electric field so as to generate a signal in response to a deformation, and actuate to deform in response to an electrical input signal. The piezoelectric materials are typically cheaper in comparison to complex control systems.

Optionally the actuator is configured to impart the load on the flexible seal member so as to substantially cancel out the detected deformation of the flexible seal member.

Substantially cancel out means that the actuator reduces at least the majority of the detected deformation. Preferably, the actuator cancels out all of the detected deformation.

With this arrangement, the wear of the flexible seal member may be reduced due to e.g. fatigue or crush loads. This reduces the probability of the flexible seal member cracking or rupturing, and increases the life-span of the flexible seal member. This may reduce the instances of seal repair or replacement.

Optionally, the flexible seal member is elongate and has a length greater than a width, wherein the width extends between the first end and the second end of the flexible seal member, the flexible seal member having a length greater than the width, and the actuator is an elongate actuator having a length greater than a width, and the length of the actuator extends along the width direction of the flexible seal member.

The flexible seal member may have a generally wedge shaped cross section with the first end thicker than the second end. The first end may be fixed to the first aircraft component and the second end may be a free end. The flexible seal member may be elongate with a generally constant section along its length.

The actuator can act across the entire width of the flexible seal member or along only a portion of the width of the flexible seal member. The largest deformation of the flexible seal member typically occurs at the second end of the flexible seal member.

Since the actuator has a length greater than a width, the actuator preferentially counteracts deflections of the flexible seal member in the width direction of the flexible seal member without also distorting the shape of the flexible seal member in the length direction. The activation of the actuator is therefore directional. The actuator and/or the sensor may be generally in the form of a strip.

Optionally the actuator and/or sensor may be positioned closer to the second end of the flexible seal member than to the first end of the flexible seal member. The actuator can therefore counter the largest deflections of the flexible seal member.

Optionally, the sensor and/or actuator is embedded in the flexible seal member.

Embedded in the flexible seal member means that the sensor and/or actuator is fully encased in the flexible seal member, or partially surrounded by the flexible seal member, e.g. partially or fully recessed into the flexible seal member from an outer surface thereof. This may protect the sensor and/or actuator during service.

The blade seal may be an aerodynamic seal which deflects under aerodynamic load.

The sensor and actuator may be configured to counter deformation of the flexible seal member due to aerodynamic loads acting upon the flexible seal member. The sensor and actuator may be configured to minimize the deformation of the blade seal during use in an aircraft, or in response to any deformation caused by airflow, pressure or vibration.

Optionally, the sensor and actuator are a sensor-actuator pair, and the blade seal comprises two or more sensor-actuator pairs, wherein each sensor of a sensor-actuator pair is configured to send a respective signal to the actuator of the sensor-actuator pair in response to local deformation of the flexible seal member in the vicinity of the sensor.

The blade seal may comprise multiple sensor-actuator pairs that each work in tandem to sense and counteract deformations in specific locations. For example, the deformation of the flexible seal member may be counteracted along the length of the blade seal at discrete locations where sensor-actuator pairs are located.

Optionally, the distance between each sensor-actuator pair is approximately equal to a resonance wavelength of the blade seal.

The deformations may be a maximum when the blade seal reaches a resonant frequency. Positioning the sensor-actuator pairs a distance apart equal to a resonance frequency allows the deformations to be counteracted at the locations they are a maximum, allowing the sensor-actuator pairs to have maximum effect.

Optionally, the blade seal may comprise three or more sensor-actuator pairs and wherein the sensor-actuator pairs are evenly spaced from each other across the length of the flexible seal member.

By evenly spacing the sensor-actuator pairs, the sensor-actuator pairs are able to distribute their effect across the flexible seal member so as to counteract deformations anywhere on the flexible seal member. The spacing may match a wavelength of oscillation. The sensor-actuator pairs can act on any frequency of oscillation, not limited to the resonance frequency.

A further aspect of the disclosure herein provides an aircraft assembly comprising a first aircraft component and a second aircraft component, and the blade seal of the first aspect, wherein the first end of the blade seal is attached to the first aircraft component, and the second end of the blade seal extends towards the second aircraft component.

Optionally the first aircraft component is one of a fixed wing portion and a moveable flight control surface, and the second aircraft component is the other one of the fixed wing portion and the moveable flight control surface.

Relative movement between the fixed wing portion and moveable flight control surface may induce flow conditions that deform (e.g. vibrate) the flexible seal member. The flexible seal member may become entrapped due to this deformation e.g. as the moveable flight control retracts towards the fixed wing portion. The deformations of the blade seal can be minimized to prevent entrapment of blade seal between the fixed wing portion and moveable flight control surface.

Optionally the moveable flight control surface is one of a flap, aileron, rudder, elevator, spoiler, slat and air brake.

Optionally the aircraft assembly comprises a fixed wing portion and a moveable trailing edge flap coupled to the fixed wing portion, wherein the first aircraft component includes a lower surface trailing edge of the fixed wing portion, and the second aircraft component includes a lower surface leading edge of the moveable trailing edge flap.

The airflow between the fixed wing lower surface trailing edge and the flap lower surface leading edge is turbulent with strong vortex shedding due to the arrangement of the wing and the flap. This imparts high aerodynamic loads and vibrations tending to deflect the blade seal.

Optionally the fixed wing portion defines a wing spanwise direction, and the flexible seal member is elongate in the wing spanwise direction.

A further aspect of the disclosure herein provides an aircraft comprising the aircraft assembly.

A further aspect of the disclosure herein provides a method operating an aircraft with a blade seal arranged to seal a gap between a first aircraft component and a second aircraft component, the blade seal comprising a flexible seal member attached to the first aircraft component, and a sensor and an actuator directly coupled to the flexible seal member, the method comprising: subjecting the blade seal to an airflow; detecting, with the sensor, deformation of the flexible seal member; sending a signal from the sensor to the actuator in response to the detected deformation of the flexible seal member; and activating the actuator to impart a load on the flexible seal member only in response to the signal received directly from the sensor by the actuator so as to counter the detected deformation of the flexible seal member.

Optionally, the method further comprises the step of moving the second aircraft component relative to the first aircraft component to open a gap between the blade seal and the second component.

Any of the features of the disclosure herein described herein as optional or desirable may be applied to any aspect of the disclosure herein, either individually or in any combination.

BRIEF DESCRIPTION OF THE DRAWINGS

Embodiments of the disclosure herein will now be described with reference to the accompanying drawings, in which.

DETAILED DESCRIPTION

Figure 1:
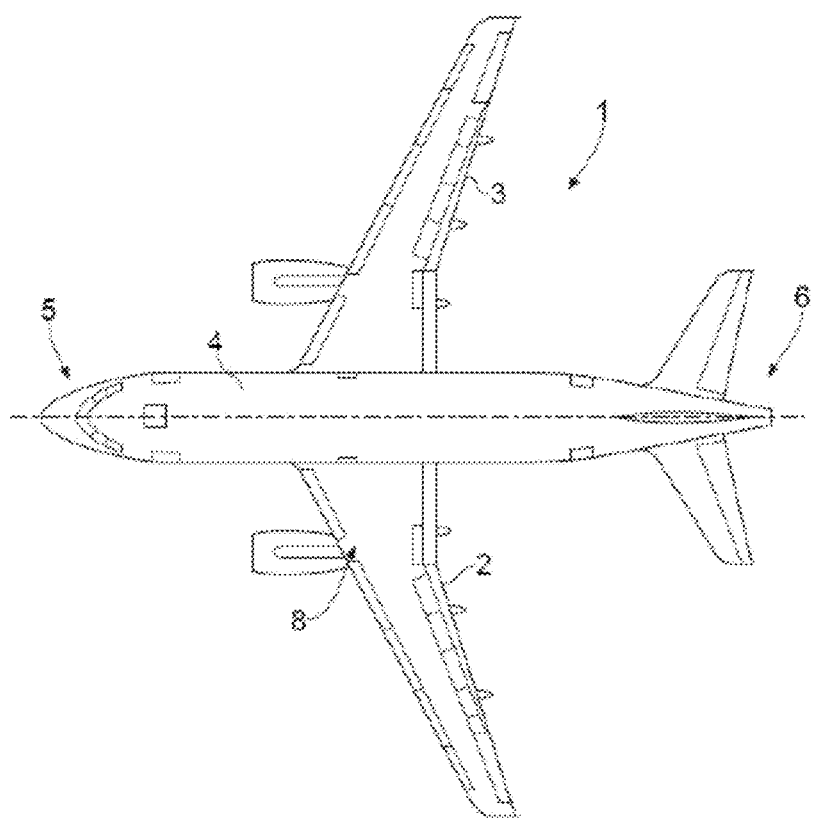
FIG. 1 shows a plan view of an aircraft.

FIG. 1 shows an aircraft 1 with starboard wing 2, port wing 3, fuselage 4, a nose end 5 and a tail end 6. The aircraft 1 is a typical jet passenger transonic transport aircraft but the disclosure herein is applicable to a wide variety of fixed wing aircraft types, including commercial, military, passenger, cargo, jet, propeller, general aviation etc.

Figure 2A:
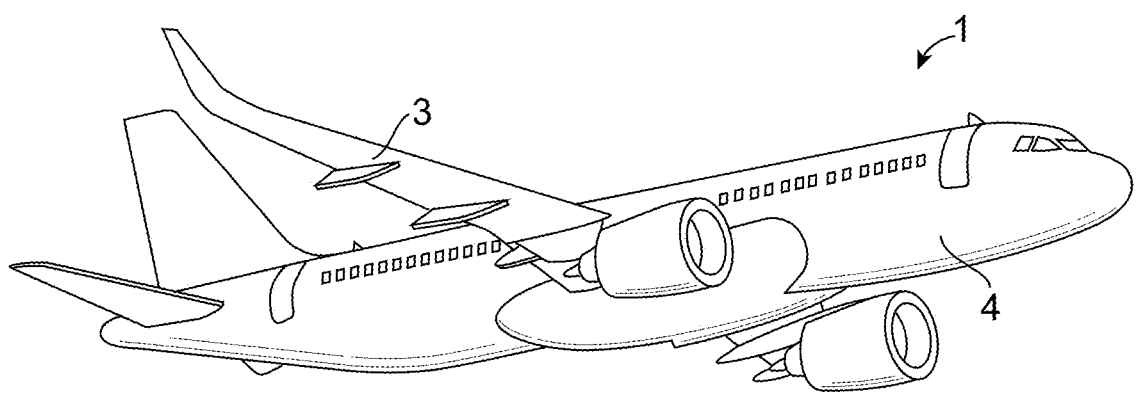
FIGS. 2A and 2B are isometric views of an aircraft.
Figure 2B:
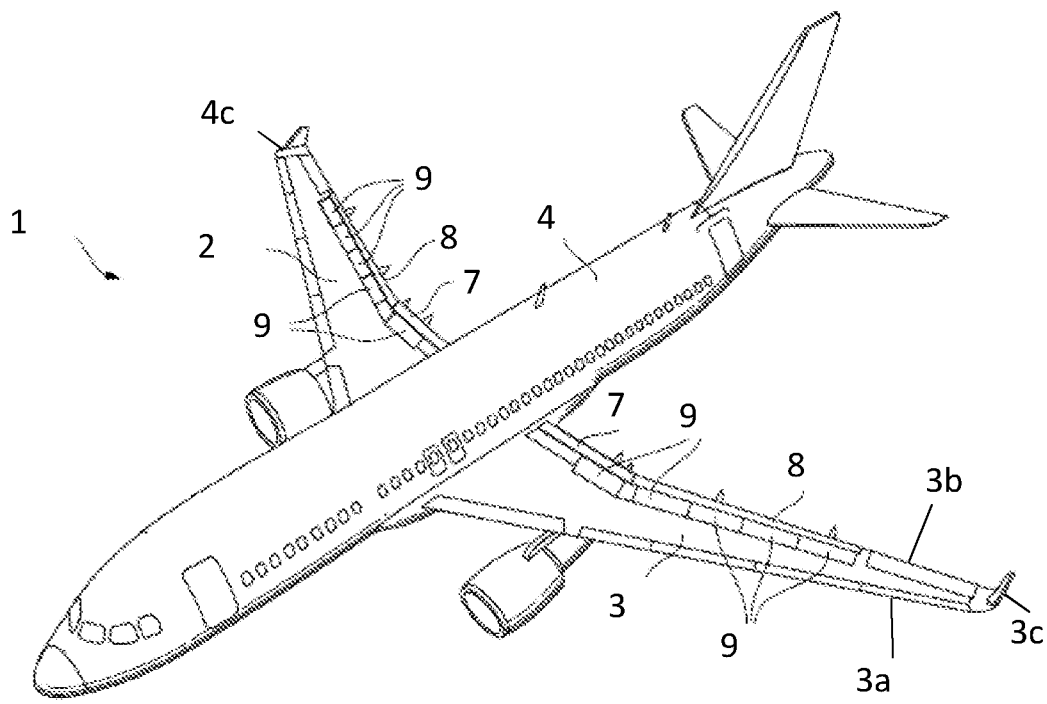

FIGS. 2A and 2B show oblique isometric views of the aircraft 1 from below and above, respectively. The direction from a leading edge of the wing 3a to the trailing edge 3b defines a chordwise direction. The direction from the wing root adjacent the fuselage 4 to the tip of each wing 3c to 4c defines a spanwise direction. Each wing 2,3 comprises movable flight control surfaces including inboard 7 and outboard 8 flaps at the wing trailing edges, and a plurality of spoilers 9 and/or air brakes. The flaps 7, 8 comprise high lift devices which are deployed during take-off, approach and landing, and the spoilers 9 comprise lift reduction devices which are deployed during descent and landing.

Figure 3A:
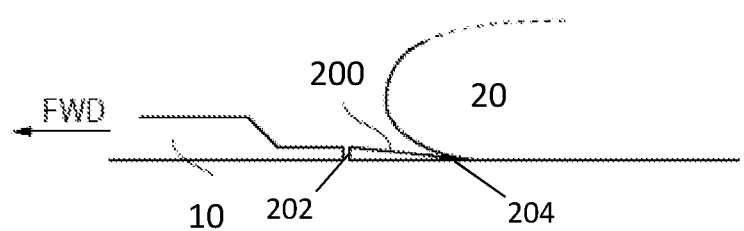
FIG. 3A-C are schematic side section views of a seal during a cruise phase (3A), a high-lift phase (3B) and a maintenance condition (3C)
Figure 3B:
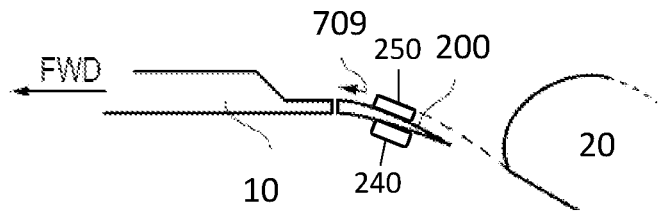
Figure 3C:
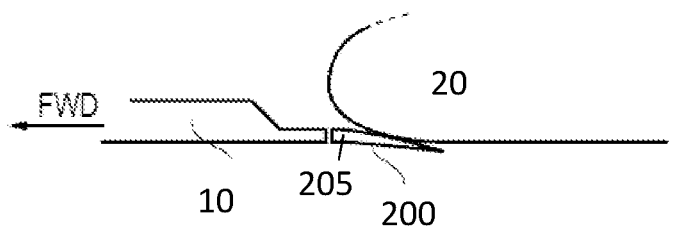

FIGS. 3A-3C schematically illustrate a first aircraft component 10 and a second aircraft component 20. A blade seal 200 is attached to the first aircraft component 10 at a first end 202. The second end 204 of the blade seal extends towards the second aircraft component 20.

In this example, the first aircraft component 10 is comprised in a fixed wing lower surface trailing edge and the second aircraft component 20 is comprised in a flap lower surface leading edge. The blade seal 200 is used to seal the gap between the lower surface wing trailing edge 10 and the leading edge 20 of the flap and helps provide a smooth aerodynamic surface when the flap is in a normal fully retracted position for cruise flight. The blade seal 200 is an aerodynamic seal which deflects under aerodynamic load.

The blade seal 200 is a substantially wedge shaped component, with a root end 210 and a tip end 220. The first end 202 of the blade seal is at the root end 210, while the second end 204 is at the tip end 220. The blade seal is relatively thicker at the first end 202 than at the second end 204, and is secured to the trailing edge of the lower wing 10 at numerous locations spanwise across the first aircraft component 10.

The blade seal 200 is a monolithic seal which has a flexible seal member 205, which is preferably made of any suitable elastomeric material, such as silicone rubber. The flexible seal member 205 may be covered with a protective layer, such as polyurethane ABR4-0177, for extra protection and smoothness on the outer surface.

The flap is moveable from the normally fully retracted configuration to one or more extended positions, e.g. for take-off and landing. When the flap is in one of the extended positions, the second end 204 of the blade seal 200 is free to vertically displace in response to airflow or vibration. Similarly, when the flap is retracted, the changes in air pressure and/or airflow causes the second end 204 of the blade seal to vertically displace as the blade seal abuts against the leading edge of the flap to create a preload against undesirable seal flutter.

FIGS. 3A-3C show an exemplary embodiment. The blade seal 200 has a sensor 240 and an actuator 250 arranged on the blade seal, which both contain piezoelectric material (only shown in FIG. 3B for clarity but which are certainly present in the configurations shown in FIGS. 3A and 3C). The sensor 240 and actuator 250 are directly coupled to the blade seal 200 via the flexible seal member 205. The sensor 240 and actuator 250 are electrically connected together, for example, through a wire (not shown). The function of the sensor and actuator will be described below with regards to the leading edge 20 of the flap and the lower surface trailing edge 10 of the wing.

Referring to FIG. 3B, during flight phases which require high lift, the leading edge 20 of the flap is required to move to a deployed configuration. When the leading edge 20 of the flap is moved to open a gap between the blade seal 200 and the first aircraft component 10, the airflow through the gap induces deformation of the blade seal 200. During movement of the flap relative to the wing, the movement of airflow through the gap between the lower wing trailing edge 10 and the leading edge 20 of the flap increases. This increased airflow and air pressure, as well as vibration of the wing and the flap, results in the deformation of the blade seal 200, and more specifically, vertical displacement of the tip 220. That tip 220 at the second end 204 of the blade seal 200 therefore deforms and deflects relative to the first, root end 202 due to aerodynamic loads. Similarly, when the flap is in one of the extended positions, the tip portion 202 of the blade seal 200 is free to vertically displace in response to airflow or vibration of the trailing edge 10 of the wing. When the flap is retracted, the preload of the flap on the blade seal 200 causes the blade seal to vertically displace.

The deformation and deflection of the blade seal 200 increases the likelihood of the blade seal 200 cracking or rupturing due to fatigue. Furthermore, deflection of the blade seal increases the likelihood of entrapment of the blade seal 200 between the lower wing trailing edge 10 and the leading edge 20 of the flap as the flap is retracted.

The sensor 240 is configured to detect deformation of the flexible seal member 205. The flexible seal member 205 deforms due to vertical displacement of the tip end 220, in either a downward or upward (i.e. generally vertical) direction. The vertical displacement of the tip end 220 may be due to airflow around the blade seal, changes in pressure or vibration of the blade seal 200. As the sensor 240 is directly coupled to the flexible seal member 205, any deformation of the flexible seal member results in deformation of the piezoelectric material within the sensor 240. The sensor then 240 generates an electrical signal in response to the deformation of the piezoelectric material. The generated electrical signal is representative of the actual deformation, such that characteristics of the signal can be interpreted to determine the characteristics of the deformation.

The sensor 240 then passively sends the signal to the actuator 250. That is to say, the electric signal generated by the sensor 240 is transmitted to the actuator 250, which oppositely deforms the actuator 250 with respect to the sensor 240. The actuator 250 is configured to activate only in response to the signal 260 (shown in FIG. 7A). The actuator 250 also contains a piezoelectric material. When the actuator 250 receives the electrical signal passively from the sensor 250, the piezoelectric material within the actuator deforms and to impart a load on the flexible seal member by exerting a force on the flexible seal member 205 to create a moment, M, which counters the deflection of the blade seal 200. That is to say the actuator deforms in response to the signal and counters the detected deformation of the flexible seal member 205. The sensor 240 and actuator 250 operate without an external power source, for example, without a controller, processor or battery system.

The actuator 250 can be tailored to different resistances to provide the necessary voltage to cause sufficient bending of the flexible seal member 205 down to counteract the deformation at the tip end 220 of the blade seal 200. The piezoelectric material may be a quartz crystal, for example. This arrangement provides a closed-loop passive system to minimize the deflection of the blade seal 200 during use.

By using the sensor 240 and actuator 250 to passively counteract the deformation of the seal, it reduces the amount of overall deflection at the tip 220 of the blade seal 200. This reduces the possibility of the seal 200 becoming entrapped between the trailing edge of the wing 10 and the leading edge of the flap 20 by moving the tip 220 of the blade seal away from the leading edge of the flap 20 while the flap is in motion. This is beneficial since an entrapped seal has an adverse effect upon the aerodynamic profile of the component. This would require a maintenance stop to be scheduled to rectify the problem.

By taking advantage of the passive material's ability to generate an electrical signal in response to a change in shape or deformation, it is possible to automatically reduce the deformation of the seal 200 to counteract undesirable shape change behaviour of the seal, such as vibration due to resonant frequencies or other transient behaviours experienced by a seal during a particular flight phase. This arrangement provides a self-contained passive control system, which does not need to be integrated into the control system of an aircraft. Furthermore, the actuator and sensor can act together without the need for further processing equipment, thereby minimizing the weight of the overall system.

In the embodiment of FIG. 3A-3C, the operation of the blade seal 200 and the sensor 240 and actuator 250 was described in relation to a trailing edge of a lower wing 10 and a leading edge of a flap 20. The first aircraft component 10 may alternatively be a moveable control surface or any other suitable fixed surface. The second aircraft component 20 may also alternatively be any suitable moveable control surface, such as a flap, aileron, rudder, elevator, spoiler, slat and air brake.

While the deformation of the blade seal 200 has been described in relation to vertical displacement of the tip 220, the sensor 240 may detect deformation of the blade seal 200 with regards to a change in shape and/or internal mechanical stress/stiffness.

Figure 4:
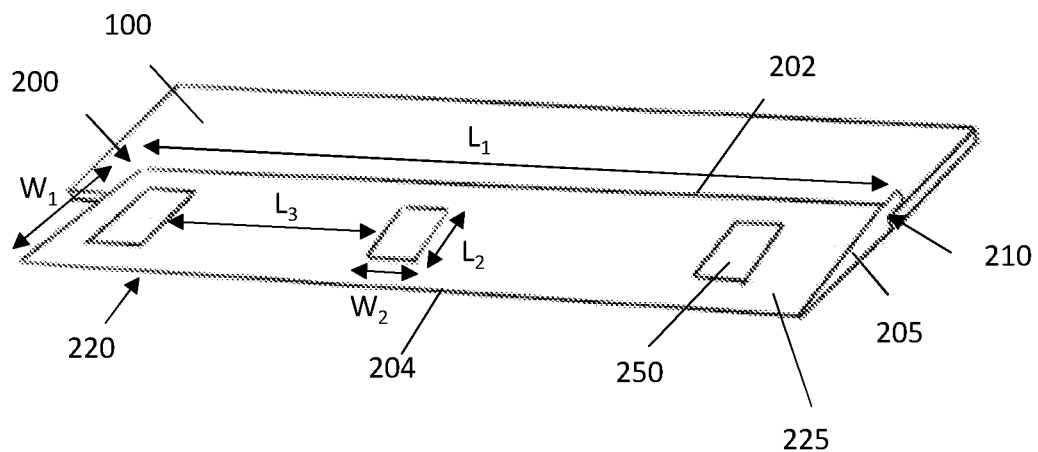
FIG. 4 illustrates schematically an aircraft component with a blade seal with a number of sensor and blade seal pairs installed according to one example.
Figure 7A:
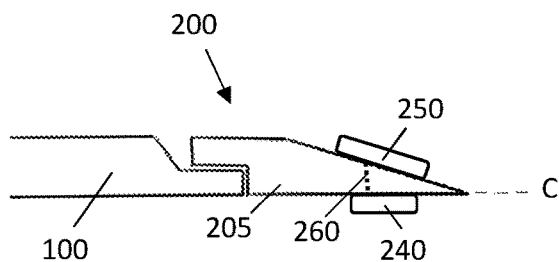
FIGS. 7A-7C illustrate schematically the deflection of a blade seal with a sensor and blade seal installed.
Figure 7B:
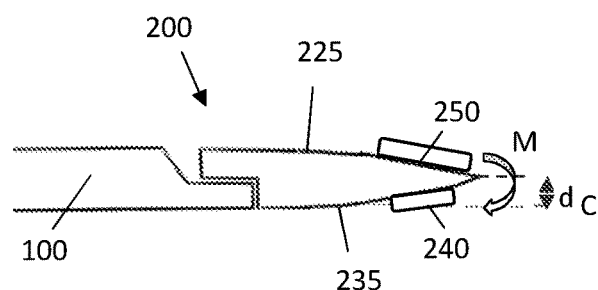
Figure 7C:
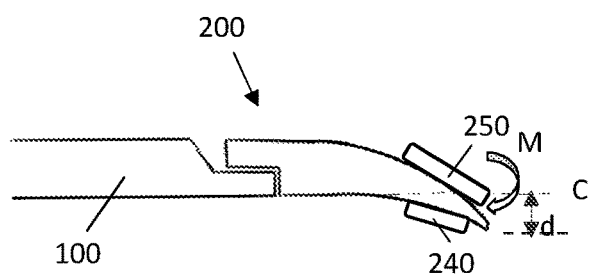

FIG. 4 shows an illustrative first aircraft component 100 with a blade seal 200, with three actuators 250 arranged on a first face 225 of the flexible seal member 205 with the sensors arranged on a second face (shown more clearly in FIG. 7A-7C). Each actuator 250 and sensor 240 act as sensor-actuator pair. That is to say, each sensor 240 passively transmits a signal to the corresponding actuator 250. The sensor and actuator pairs are configured to counter deformation of the tip 220 due to aerodynamic loads. The flexible seal member 205 of the blade seal has a length $L_1$ and a width $W_1$. The width $W_1$ of the flexible seal member 205 is between the first end 202 and the second end 204. The flexible seal member 205 is elongate, so the length $L_1$ is greater than the width $W_1$ of the flexible seal member.

Figure 5:
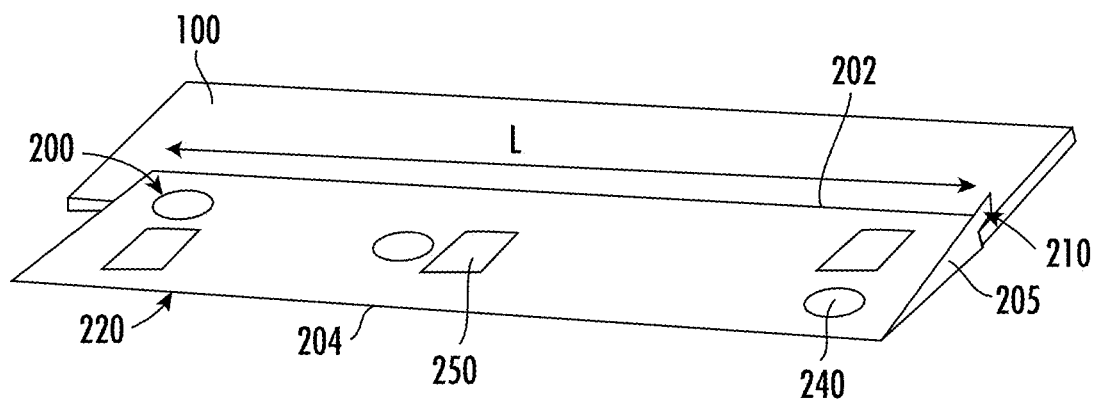
FIG. 5 illustrates schematically an aircraft component with a blade seal with a number of sensor and blade seal pairs installed according to another example.

By having three actuator 250 and sensor 240 pairs along the length $L_1$ of the flexible seal member, the deformation along the entire length of the blade seal 200 can be minimized. The blade seal 200 is shown in FIGS. 4 and 5 to have three or more sensor-actuators pairs which are evenly spaced from each other across the length of the flexible seal member 205. However, any number of actuator and sensor pairs may be used along the length of the blade seal 200. For example, the sensor-actuator pairs may be arranged to counter the natural frequency of the blade seal 200. The natural frequency of the blade seal is determined by the shape, size and materials of the blade seal 200. Consequently, the distance between each sensor-actuator pair may be equal to a resonance wavelength of the blade seal 200 to minimize the deflection of the tip 220 and alter the natural frequency of the flexible seal member 205 by stiffening the flexible seal member. The sensor-actuator pairs may be arranged at a distance from each other $L_3$ which is approximately equal to a resonance wavelength of the blade seal.

Arranging multiple sensor-actuator pairs along the blade seal 200 is advantageous as it adds minimal weight to the first aircraft component 100. As the sensor-actuators pairs have negligible weight, these are advantageous compared to conventional method of reinforcing the seals (e.g. by making it stiffer/infusing materials into the flexible seal member 205) as this arrangement does not increase the overall weight of the aircraft. Furthermore, the sensor-actuator pairs can be installed on pre-existing blade seals, or any seal, without changing the geometry, material of stiffness of the material.

This arrangement also does not alter the flexibility of the flexible seal material 205 and therefore does not make the blade seal 200 ineffective as a seal. Furthermore, by reducing the overall deflection of the blade seal 200, this avoids premature cracking or rupture of the seal, which improves the reliance of the aircraft. Because the sensor-actuator system is passive and requires no external power to operate, it has a simpler design, lower cost, easy to maintain and lower weight. It provides a reduction of cost associated with repair and refitting damaged seals.

FIGS. 4 and 5 also show the actuator 250 in greater detail. The actuator 250 has a length $L_2$ and a width $W_2$. The actuator is substantially elongate, that is to say its length $L_2$ is greater than its width $W_2$. As there is negligible strain generated within the blade seal 200 in the spanwise direction, the actuator 250 is preferably arranged such that the length $L_2$ of the actuator extends from second end 204 to the first end 202 of the flexible seal member 205. That is to say that the actuator 250 is preferably arranged in the chordwise direction along the width $W_1$ of the blade seal 200. This allows the actuator 250 to allow to counteract the deflection of the tip 220. The orientation, shape and size of the actuator 250 can be adjusted to suit the size and shape of the blade seal 200 to be used, or the area of the blade seal 200 where the actuator 250 will be installed. Preferably, the actuator 250 is arranged in the area where there is the largest deformation of the blade seal 200.

Since the actuator 250 has length $L_2$ greater than width $W_2$, the actuator preferentially counteracts deflections of the flexible seal member 205 in the width direction $W_1$ of the flexible seal member without also distorting the shape of the flexible seal member in the length direction $L_1$. The activation of the actuator is therefore directional. The actuator and/or the sensor may be generally in the form of a strip.

Similarly, while the sensor 240 is shown schematically to be circular in FIG. 5, it will be understood that the sensor 240 can be any suitable orientation, shape and size of to suit the size and shape of the blade seal 200 to be used, or the area of the blade seal where the sensor 240 will be installed.

FIGS. 4, 7A-7C show the sensors 240 arranged on a first face 225 of the flexible seal member 205 and the actuator 250 arranged underneath in a corresponding location directly under the sensor 240 on a second face 235. This arrangement allows the actuator 250 to counteract the deformation on the relevant affected part of the blade seal 200 detected by the sensor 240. However, the actuator 250 may alternatively be placed on the first face 225 of the flexible seal member 205 adjacent to the sensor 250. This arrangement enables the sensor 240 and actuator 250 to act upon the same area of the flexible seal member 205. They may be affixed by any suitable method, such as glue, mechanical fastening or adhesives.

Alternatively, either sensor 240 or actuator 250 may be partially or fully embedded into the flexible seal member 205. Embedding or partially embedding the sensor-actuator pair may provide more accurate readings regarding the deformation of the flexible seal member 205 and may also improve the longevity of the sensor-actuator pair.

FIG. 7A through 7C show that the sensor 240 and actuator 250 arranged distal from the root end 210 of the blade seal 200 and proximal to the tip end 220. However, the sensor 240 and actuator 250 may be placed along the width $W_1$ of the flexible seal member 205 at any position to counteract the deformation of the blade seal 200. Preferably, the sensor 240 and actuator 250 are arranged proximal to the tip end 220 as the tip end 220 will experience the largest deflection with respect to the root end 210. That is to say, the actuator 250 and/or sensor 240 is preferably arranged closer to the second end 204 of the flexible seal member 205 than the first end 202 of the flexible seal member. The actuator can therefore counter the largest deflections of the flexible seal member.

Figure 6:
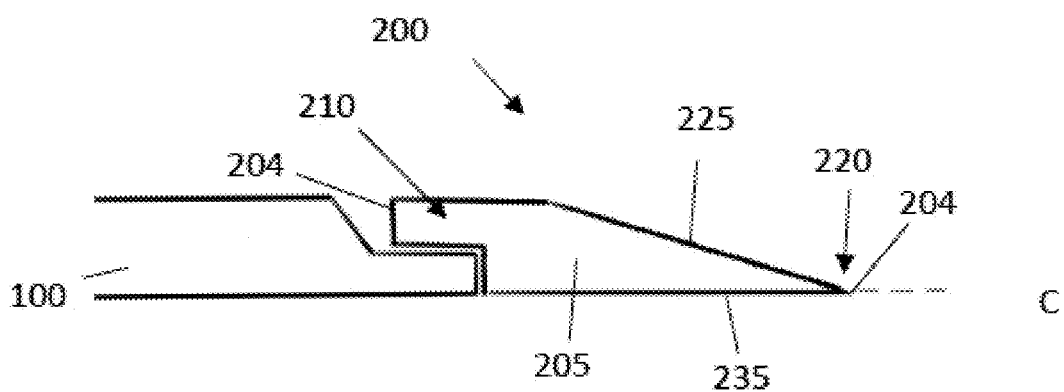
FIG. 6 shows a detailed cross section view of the blade seal.

The action of the sensor 240 and the actuator 250 will be described in greater detail using FIGS. 6, 7A-7C and 8A-8C. FIG. 6 shows the blade seal 200 in a neutral position. This is indicated when the tip end 220 of the blade seal 200 is in line with the center line C. In this neutral position, the blade seal is substantially straight such that the tip of the blade seal 220 has not undergone substantial vertical displacement relative to its root 210, or the first edge 202 which is affixed onto aircraft component 100.

Figure 8A:
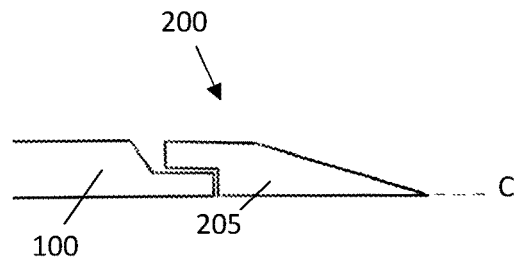
FIG. 8A-8C illustrate schematically the deflection of the blade seal without the disclosure herein.
Figure 8B:
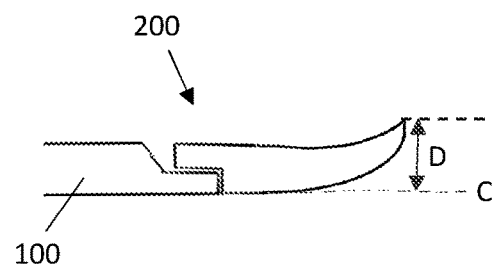
Figure 8C:
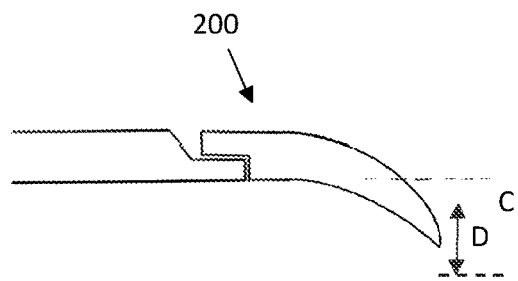

FIGS. 7A-7C show the blade seal 200 with the sensor 240 and actuator 250 pair directly coupled to the flexible seal member 205 and in use. FIGS. 8A-8C show an identical blade seal 200 without the sensor and actuator system pair installed. In FIGS. 8B and 8C, the tip 220 of the blade seal 200 is deformed vertically (shown upward in FIG. 8B and downward in 8C) by a distance D. In contrast, the actuator and sensor pair shown in FIGS. 7B and 7C reduce the overall displacement of the tip 220 to d. While the deflection d is shown to be less than D in FIGS. 7B and 7C, the actuator 240 may act upon the blade seal 200 to return the tip 220 to the neutral position (indicated by center line C).

During use, the tip end 220 may displace by a distance D (shown upward in FIG. 8B and downward in FIG. 8C) in response to, changes in airflow or air pressure around the blade seal 200 or oscillations/vibrations caused by the aircraft component 100.

The sensor 240 and actuator 250 are in electrical communication with each other, such that any signal generated by the sensor 240 is received by the actuator 250 (indicated schematically through line 260 in FIG. 7A) in FIGS. 7A-7C.

The signal 265 is sent passively to the actuator 250. That is to say, the piezoelectric material in the sensor 250 creates a voltage signal upon deformation, which is automatically transmitted to the actuator 250. Upon passively receiving the signal 260, the actuator 240 passively activates in response to the signal. That is to say, the piezoelectric material within the actuator 240 automatically deforms. The actuator 250 and the sensor 240 may be connected through an electrical wire, or by being in close proximity with each other such that the voltage output of the sensor 240 is transmitted to the actuator 250 through the flexible seal material 205.

When the actuator 250 deforms, it exerts a force on the blade flexible seal member 205 of the blade seal to create a moment M. Moment M counters the deflection D, so that the tip 220 of the blade seal is only deflection by distance d. This moves the tip 220 of the blade seal closer to the center line C. The overall deflection d is then less than the original deflection of the tip 220 D. The sensor and actuator therefore dampens the overall deflection of the flexible seal member 205. The actuator 250 acts to counteract the deformation of the blade seal tip 220. The actuator may be able to deflect the tip down to the centerline C, but generally reduces the amount of overall deflection. Therefore, the actuator 250 is configured to substantially cancel out the detected deformation of the flexible seal member.

As the tip 220 of the blade seal 200 returns back towards the center line C, the electrical signal generated by the sensor 240 decreases. The arrangement of the sensor 240 and actuator 250 provides a passive system to ensure the deflection of the tip 220 is reduced. By reducing the deflection d of the tip 220, the blade seal 200 is less prone to fatigue wear and rupture.

The arrangement described above in relation to FIGS. 7A-7C provides a seal whose deformation (which includes all geometric properties and internal mechanical properties, and which may have a direct influence on stiffness) can be countered due to movement of the seal tip. This provides a seal design with improved longevity as it is less prone to rupture or entrapment during flight as the deflection of seal is reduced.

In other embodiments the blade seal 200 may not undergo a shape change, but may instead undergo another type of deformation, such as internal configuration change caused by a change in internal mechanical stresses leading to a change in mechanical stiffness.

As described above, the actual overall deformation is achieved by the sensor 240 sensing deformation in the blade seal 200 and sending signals to the actuator 250 which counters the deformation by creating a moment M in the blade seal 200 to counteract the deflection. While the signals may typically not exactly correspond to the desired deformation, the actual deformation achieved is determined by voltage output of the sensor material in response to the actual deformation and the moment created by the actuator in response via the methods described above (and in particular as illustrated in FIGS. 7A-7C).

Although the disclosure herein has been described above with reference to one or more preferred embodiments, it will be appreciated that various changes or modifications may be made without departing from the scope of the disclosure herein as defined in the appended claims.

In particular, the embodiments described above utilise piezoelectric materials to achieve the required displacement of the aircraft component, but in other embodiments other suitable materials may be used. For example, shape memory alloys may be used to actuate the flexible seal member or strain gauges may be used as a sensor.

Similarly, while they are described as applied to the trailing edge of an aerodynamic component, the blade seal and actuator-sensor arrangement could be similarly applied to other aerospace and non-aerospace applications. e.g. the blade seal may be attached to the fixed trailing edge of an aircraft wing for sealing against an aileron, or for landing gear sealing or door seals, for example. The blade seal of this disclosure herein may be used to seal between virtually any pair of fixed or movable structures on an aircraft, such as a flap, aileron, rudder, elevator, spoiler, slat and air brake, or cargo or landing gear bay doors.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A blade seal for sealing a gap between a first aircraft component and a second aircraft component, comprising:
   a flexible seal member having a first end for attaching to the first aircraft component and a second end for extending towards the second aircraft component;
   a sensor and an actuator directly coupled to the flexible seal member;
   wherein the sensor is configured to detect deformation of the flexible seal member and send a signal to the actuator in response to the detected deformation;
   the actuator is configured to impart a load on the flexible seal member and to activate only in response to the signal received directly from the sensor by the actuator so as to counter the detected deformation of the flexible seal member;
   wherein the sensor and actuator are a sensor-actuator pair, and the blade seal comprises two or more sensor-actuator pairs, wherein each sensor of a sensor-actuator pair is configured to send a respective signal to the actuator of the sensor-actuator pair in response to local deformation of the flexible seal member in a vicinity of the sensor; and
   wherein a distance between each sensor-actuator pair is approximately equal to a resonance wavelength of the blade seal.

2. The blade seal of claim 1, wherein the actuator is a piezoelectric actuator and/or the sensor is a piezoelectric sensor.

3. The blade seal of claim 1, wherein the actuator is configured to impart the load on the flexible seal member to substantially cancel out the detected deformation of the flexible seal member.

4. The blade seal of claim 1, wherein the flexible seal member is elongate and has a length greater than a width, wherein the width extends between the first end and the second end of the flexible seal member, and the actuator is an elongate actuator having a length greater than a width, and the length of the actuator extends along the width direction of the flexible seal member.

5. The blade seal of claim 1, wherein the actuator and/or sensor is closer to the second end of the flexible seal member than to the first end of the flexible seal member.

6. The blade seal of claim 1, wherein the sensor and/or actuator is embedded in the flexible seal member.

7. The blade seal of claim 1, wherein the blade seal is an aerodynamic seal configured to deflect under aerodynamic load.

8. The blade seal of claim 7, wherein the sensor and actuator are configured to counter deformation of the flexible seal member due to aerodynamic loads acting upon the flexible seal member.

9. The blade seal of claim 1, comprising three or more sensor-actuator pairs and wherein the sensor-actuator pairs are evenly spaced from each other across a length of the flexible seal member.

10. The blade seal of claim 1, wherein the sensor and actuator are configured to operate in an absence of any external power source.

11. An aircraft assembly comprising a first aircraft component and a second aircraft component, and the blade seal of claim 1, wherein the first end of the blade seal is attached to the first aircraft component, and the second end of the blade seal extends towards the second aircraft component.

12. The aircraft assembly of claim 11, wherein the first aircraft component is one of a fixed wing portion and a moveable flight control surface, and the second aircraft component is another of the fixed wing portion and the moveable flight control surface.

13. The aircraft assembly of claim 12, wherein the moveable flight control surface is a flap, aileron, rudder, elevator, spoiler, slat or air brake.

14. The aircraft assembly according to claim 11, comprising a fixed wing portion and a moveable trailing edge flap coupled to the fixed wing portion, wherein the first aircraft component includes a lower surface trailing edge of the fixed wing portion, and the second aircraft component includes a lower surface leading edge of the moveable trailing edge flap.

15. The aircraft assembly of claim 14, wherein the flexible seal member is elongate and has a length greater than a width, wherein the width extends between the first end and the second end of the flexible seal member, and the actuator is an elongate actuator having a length greater than a width, and the length of the actuator extends along the width direction of the flexible seal member, wherein the fixed wing portion defines a wing spanwise direction, and wherein the flexible seal member is elongate in the wing spanwise direction.

16. An aircraft comprising the aircraft assembly of claim 11.

17. A method of operating an aircraft with a blade seal arranged to seal a gap between a first aircraft component and a second aircraft component, the blade seal comprising a flexible seal member attached to the first aircraft component, and a sensor and an actuator directly coupled to the flexible seal member, and wherein the sensor and actuator are a sensor-actuator pair, and the blade seal comprises two or more sensor-actuator pairs, wherein each sensor of a sensor-actuator pair is configured to send a respective signal to the actuator of the sensor-actuator pair in response to local deformation of the flexible seal member in a vicinity of the sensor, and wherein a distance between each sensor-actuator pair is approximately equal to a resonance wavelength of the blade seal,
   the method comprising:
   subjecting the blade seal to an airflow;
   detecting, with at least one of the sensors, deformation of the flexible seal member;
   sending a signal from the sensor to the actuator in response to the detected deformation of the flexible seal member; and
   activating the actuator to impart a load on the flexible seal member only in response to the signal received directly from the sensor by the actuator to counter the detected deformation of the flexible seal member.

18. The method of claim 17, further comprising moving the second aircraft component relative to the first aircraft component to open a gap between the blade seal and the second component.

\* \* \* \* \*